United States Patent [19]

Furlani et al.

[11] Patent Number: 5,700,411
[45] Date of Patent: Dec. 23, 1997

[54] METHOD FOR THE FABRICATION OF THREADED CERAMIC PARTS

[75] Inventors: Edward P. Furlani, Lancaster; Dilip K. Chatterjee; Syamal K. Ghosh, both of Rochester, all of N.Y.

[73] Assignee: Eastman Kodak Company, Rochester, N.Y.

[21] Appl. No.: 752,133

[22] Filed: Nov. 21, 1996

[51] Int. Cl.$^6$ .................................................. B29C 67/00
[52] U.S. Cl. ........................... 264/125; 264/219; 264/220; 264/221
[58] Field of Search ..................... 264/57, 125, 219, 264/220, 221, 635, 645

[56] References Cited

U.S. PATENT DOCUMENTS

| | | | |
|---|---|---|---|
| 4,426,568 | 1/1984 | Kato et al. | 219/270 |
| 4,949,194 | 8/1990 | MacPherson et al. | 360/104 |
| 5,209,525 | 5/1993 | Ito | 285/137.1 |

Primary Examiner—Christopher A. Fiorilla
Attorney, Agent, or Firm—Raymond L. Owens

[57] ABSTRACT

A method of fabricating a threaded micro-ceramic part, includes the steps of: forming a sacrificial fiber, having a melting temperature greater than the sintering temperature of the ceramic material to be used to mold the threaded micro-ceramic part; winding the sacrificial fiber about a sintered ceramic plug generally in the shape of the threaded micro-ceramic part with the winded fiber corresponding to threads; providing a green ceramic housing formed with a passage and placing the plug with the wound sacrificial fiber in the passage. The method further includes the steps of sintering the green ceramic housing containing the wound sacrificial fiber plug to provide a unitary structure; removing the wound sacrificial fiber from the unitary structure forming a threaded cavity in the unitary structure; removing the plug leaving behind a threaded mold which is adapted to form the threaded micro-ceramic part; compressing ceramic powder within the threaded mold; and sintering the threaded mold containing the compressed ceramic powder to harden the sintered ceramic powder to form the threaded micro-ceramic part whereby during sintering the formed threaded micro-ceramic part shrinks to permit its removal from the mold.

7 Claims, 6 Drawing Sheets

METHOD FOR THE FABRICATION OF THREADED CERAMIC PARTS

CROSS REFERENCE TO RELATED APPLICATION

Reference is made to commonly assigned U.S. patent application Ser. No. 08/751,529 filed Nov. 14, 1996, entitled "A Method for the Fabrication of Micro-Electromechanical Ceramic Parts With an Electrical Trace", by Chatterjee et al, the teachings of which are incorporated herein.

FIELD OF THE INVENTION

This invention relates generally to a method for fabricating a threaded molded part from ceramic powder.

BACKGROUND OF THE INVENTION

Conventional threaded parts such as screws are fabricated by extruding a base material into a desired shape and then threading it in a die. This method is inadequate for the fabrication of threaded micro-ceramic parts which have a cross-sectional dimension on the order of 1 mm and threaded features on the order of 100 microns. Although such parts can be extruded they are not sufficiently rigid to withstand the application of a conventional threaded die. Furthermore, such conventional dyes cannot be fabricated with threaded features on the order of 100 microns.

SUMMARY OF THE INVENTION

It is an object of the present invention to provide a method for fabricating a threaded micro-ceramic part. This object is achieved in a method of fabricating a threaded micro-ceramic part, comprising the steps of:

a) forming a sacrificial fiber, having a melting temperature greater than the sintering temperature of the ceramic material to be used to mold the threaded micro-ceramic part;

b) winding the sacrificial fiber about a sintered ceramic plug generally in the shape of the threaded micro-ceramic part with the winded fiber corresponding to threads;

c) providing a green ceramic housing formed with a passage and placing the plug with the wound sacrificial fiber in the passage;

d) sintering the green ceramic housing containing the wound sacrificial fiber plug to provide a unitary structure;

e) removing the wound sacrificial fiber from the unitary structure forming a threaded cavity in the unitary structure;

f) removing the plug leaving behind a threaded mold which is adapted to form the threaded micro-ceramic part;

g) compressing ceramic powder within the threaded mold; and h) sintering the threaded mold containing the compressed ceramic powder to harden the sintered ceramic powder to form the threaded micro-ceramic part whereby during sintering the formed threaded micro-ceramic part shrinks to permit its removal from the mold.

ADVANTAGEOUS EFFECT OF THE INVENTION

It is an advantage of the present invention to provide a fabrication method which can effectively and yet inexpensively produce threaded micro-ceramic parts.

It is another advantage that such threaded micro-ceramic parts can be used in harsh corrosive and high temperature environments.

These and other aspects, objects, features, and advantages of the present invention will be more clearly understood and appreciated from a review of the following detailed description of the preferred embodiment and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

The present invention involves a method of making threaded micro-ceramic parts. When the term "threaded micro-ceramic part" is used it refers to the fact that the threaded features are on the order of 100 microns or less. The method utilizes a sacrificial fiber made from refractory materials such as tungsten (W), molybdenum (Mo), or Tantalum (Ta), which have a melting point above the sintering temperature of the ceramic mold used to form the threaded micro-ceramic part.

The method in accordance with the invention includes the following steps: First, a sacrificial fiber is wound in a helical fashion on a cylindrical ceramic plug. Second, the ceramic plug with wound sacrificial fiber is inserted into a passage in a green ceramic housing. Third, the green ceramic housing is sintered. Fourth, the sacrificial fiber is removed leaving a helical grooved path through the sintered ceramic housing. Fifth, the sintered ceramic housing is drilled to form a mold concentric with, and extending to, the helical threaded structure. Sixth, ceramic power is pressed into the cavity and threaded grooves. Lastly, the sintered ceramic housing with pressed ceramic powder is sintered. Upon sintering, the pressed ceramic powder takes the form of the mold with a raised thread in the form of a helix along its length. This threaded micro-ceramic part is easily removed because of approximately 25% shrinkage it undergoes during the sintering process.

The method of the present invention will be described in conjunction with the fabrication of a specific threaded micro-ceramic part.

Figure 1:
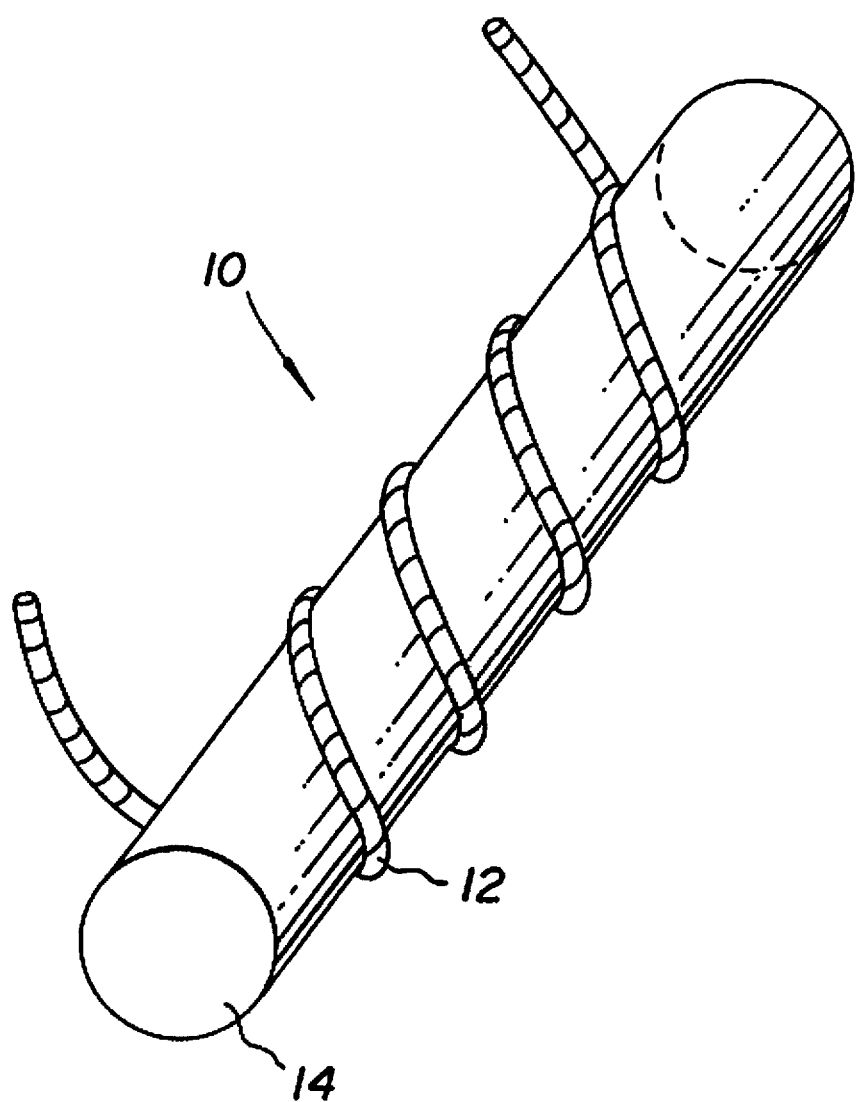
FIG. 1 is a perspective view of a ceramic plug with a wound sacrificial fiber.

Referring to FIG. 1, a ceramic component 10 chosen to teach the present method is comprised of a sacrificial fiber 12 wound in a helical fashion on a cylindrical sintered ceramic plug 14. The ceramic plug 14 is selected from ceramics such as $Al_2O_3$, $ZrO_2$, AlN, BN, MgO, $Al_2O_3$—$ZrO_2$ and other oxide and non-oxide composites thereof. The sacrificial fiber 12 is made from refractory materials such as W, Mo, or Ta and is on the order of 100 microns in diameter or less.

Figure 2A:
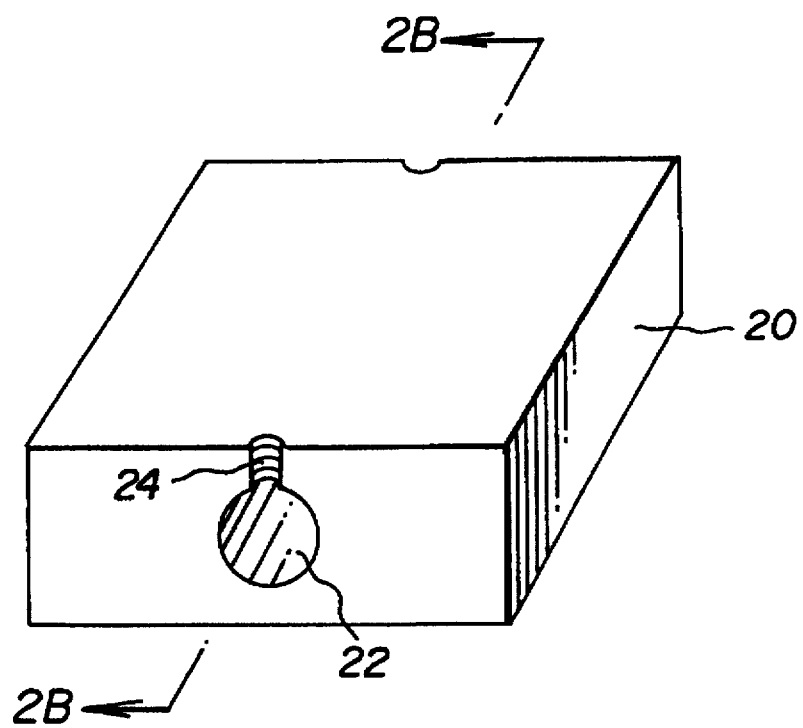
FIGS. 2A and 2B respectively illustrate, a perspective and cross-sectional view of a ceramic housing formed with a passage for receiving the plug and sacrificial fiber shown in FIG. 1.
Figure 2B:
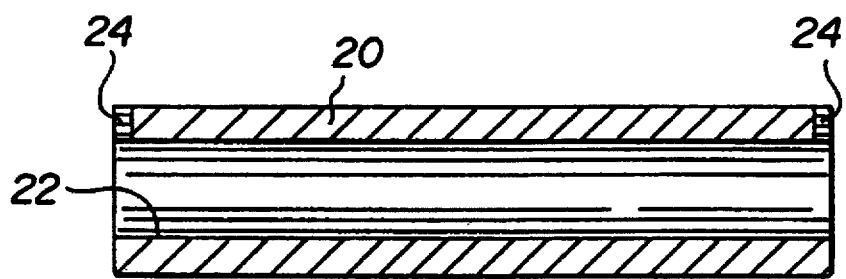

Referring to FIGS. 2A and 2B, illustrated in perspective and cross-sectional view respectively, a rectangular ceramic housing 20, to be selected from ceramics such as $Al_2O_3$, $ZrO_2$, AlN, BN, MgO, $Al_2O_3$—$ZrO_2$ and other oxide and non-oxide composites thereof, in a green state, is formed with a cylindrical passage 22 and grooved paths 24 leading from the ends of the cylindrical passage 22 to the surface of the part.

Figure 3A:
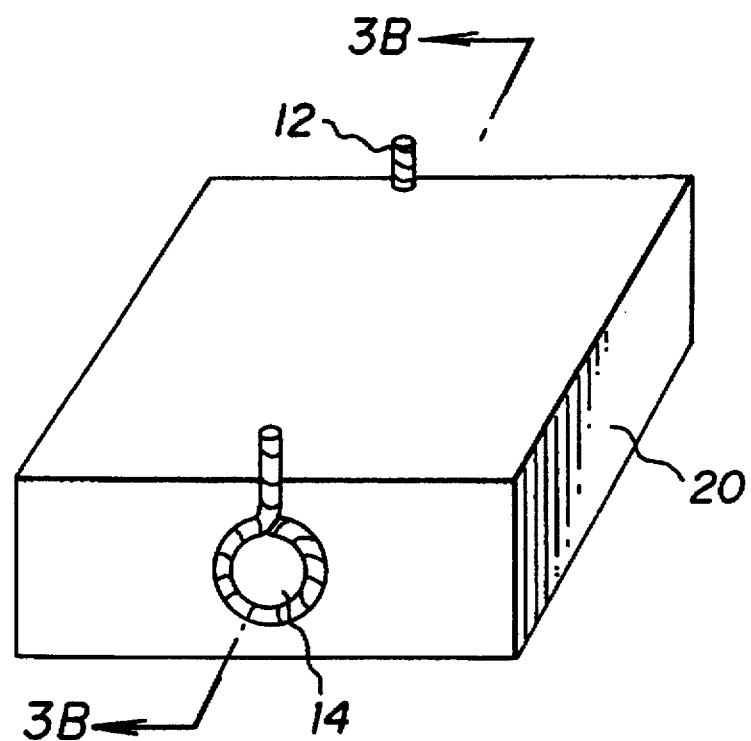
FIGS. 3A and 3B illustrate views similar to FIGS. 2A and 2B but with the plug and sacrificial fiber of FIG. 1 inserted into the housing passage.
Figure 3B:
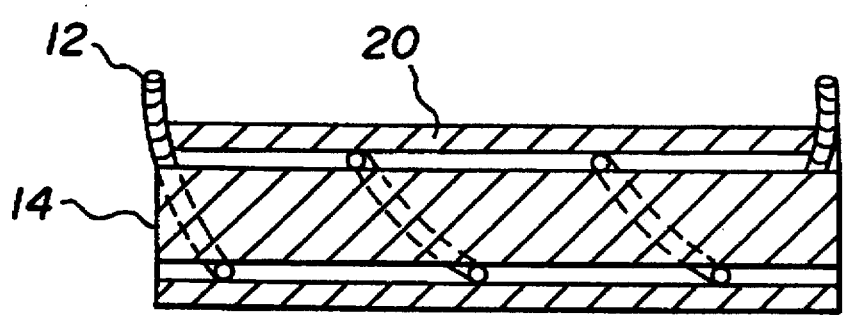

Referring next to FIGS. 3A and 3B, in the next step of the process, the sintered ceramic plug 14 with wound sacrificial fiber 12 is inserted into the cylindrical passage 22. The free ends of sacrificial fiber 12 are fixed in grooved paths 24 and anchored to the top of the ceramic housing 20. It is instructive to note that the diameter of the cylindrical passage 22 is large enough to accommodate the inserted ceramic plug 14 with the wound sacrificial fiber 12 with additional space to allow for 20 to 30% shrinkage of the cylindrical passage 22 upon sintering so as to preclude fracturing of the micro-molded part 20 during the sintering process.

Figure 4A:
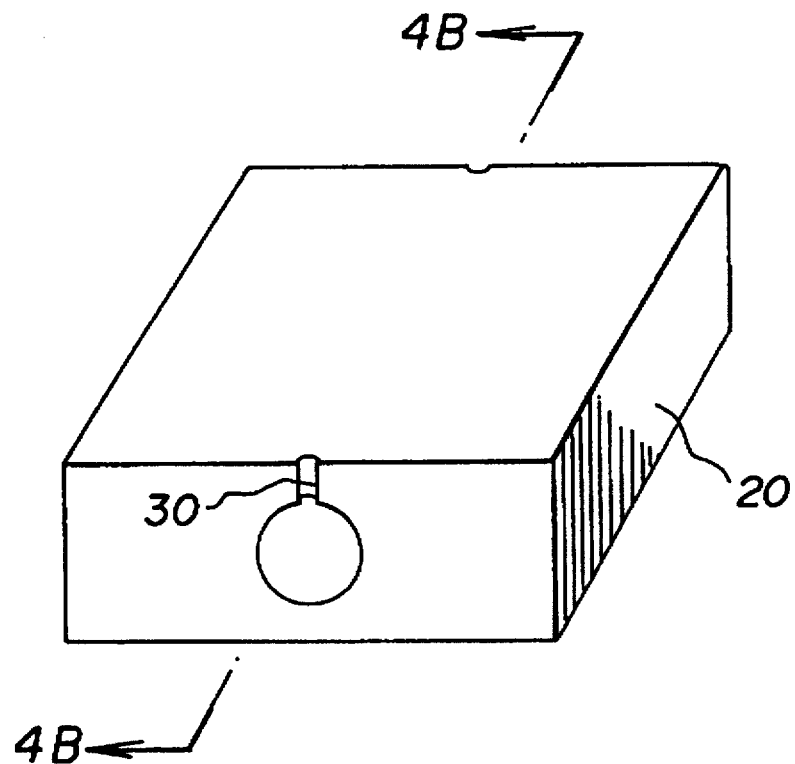
FIGS. 4A and 4B illustrate views similar to FIGS. 3A and 3B but with the sacrificial fiber being removed.
Figure 4B:
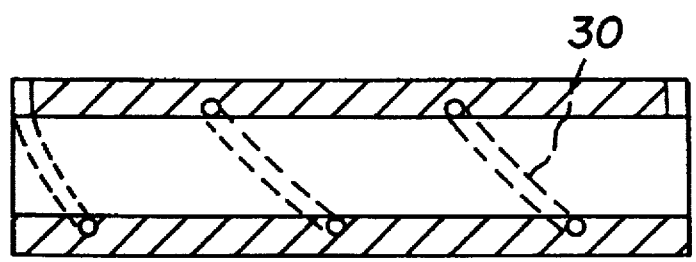

Referring now to FIGS. 4A and 4B, in the next step of the process, the structure of FIGS. 3A and 3B is sintered and the embedded sacrificial helical fiber 12 is removed leaving a helical path 30 through the sintered ceramic housing 20. The sacrificial helical fiber 12 is removed either by etching it away using ammonium hydroxide $NH_4OH$ or hydrochloric acid HCl, or raising the temperature of the sintered structure above the melting point of the sacrificial fiber 12 thereby burning it out.

Figure 5A:
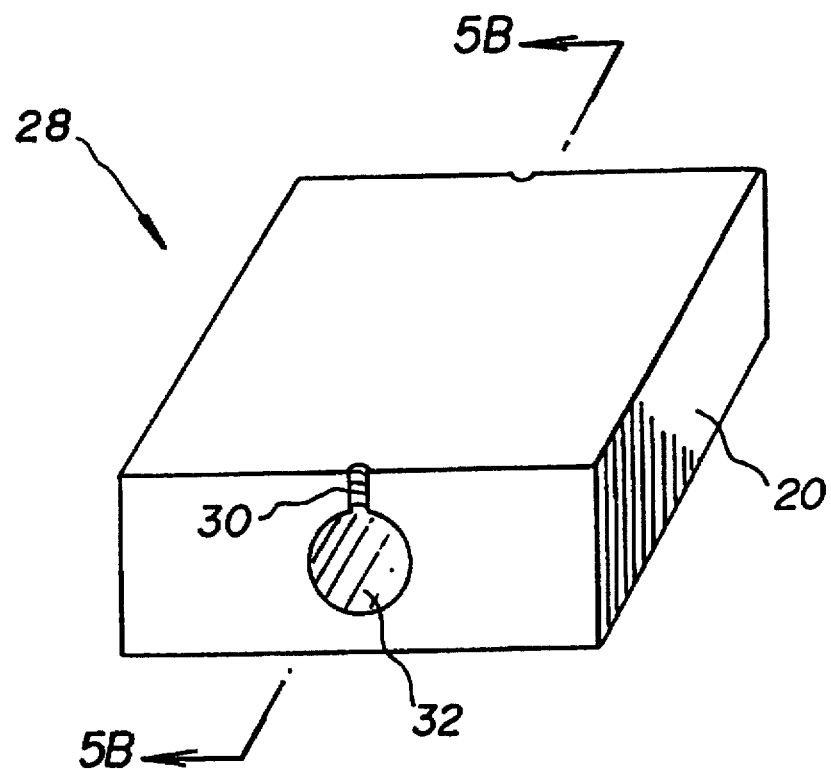
FIGS. 5A and 5B are views similar to the FIGS. 4A and 4B but with the plug being drilled out from the housing.
Figure 5B:
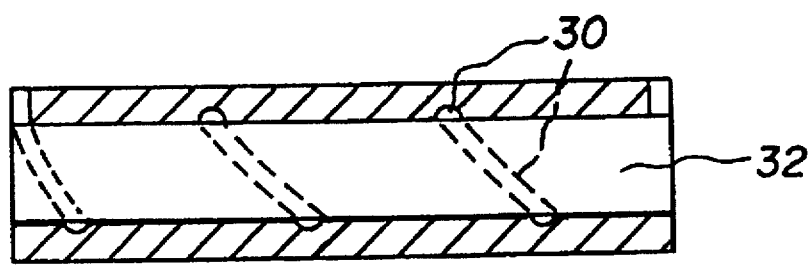

Referring to FIGS. 5A and 5B, illustrated in perspective and cross-sectional view, respectively, the sintered ceramic housing 20 with helical path 30, and with a passage 32 drilled through it in such a way so as to form a cavity concentric with, and extending into, the helical path to thereby provide a mold for forming the threaded micro-ceramic part. The sintered ceramic housing 20 with helical path 30, and with a passage 32 constitute a unitary structure 28.

Figure 6:
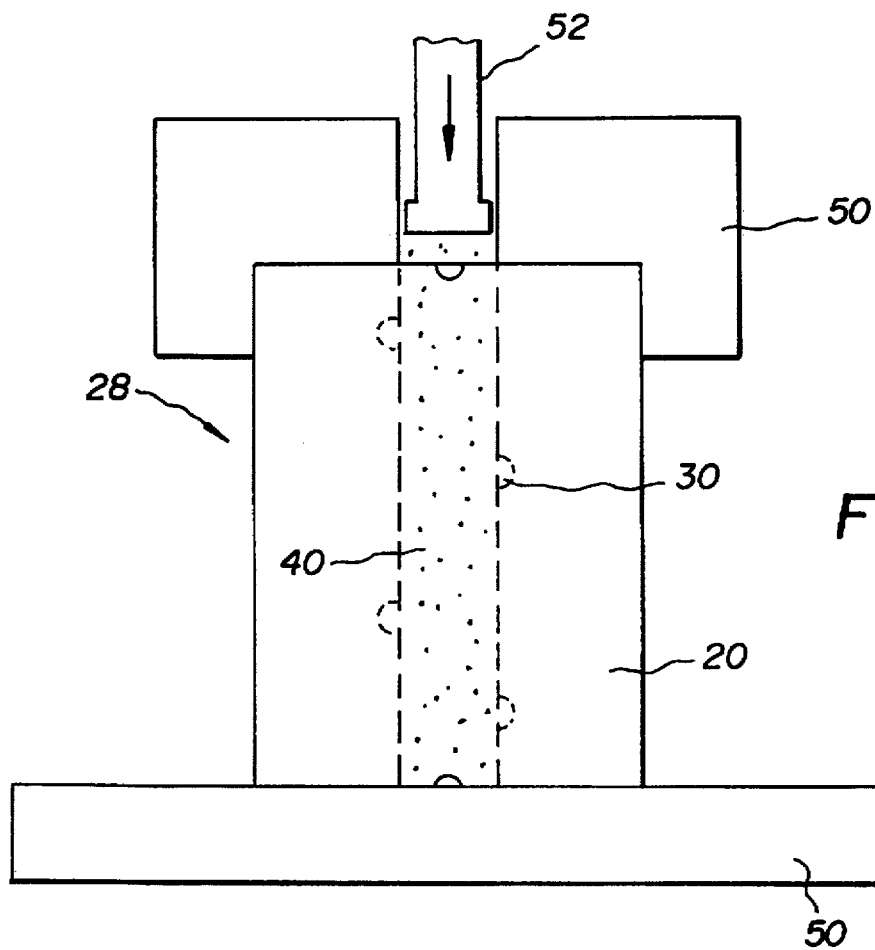
FIG. 6 shows a schematic structure for mounting the drilled out housing of FIGS. 5A and 5B for forming the micro-ceramic part.
Figure 7:
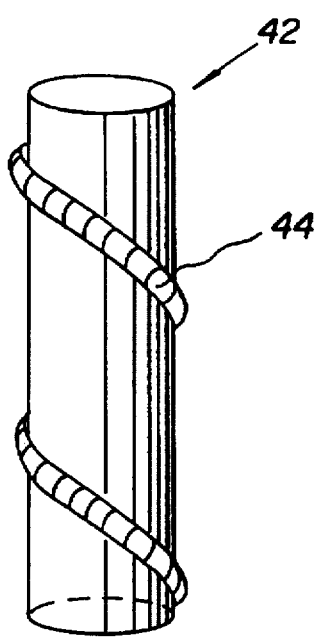
FIG. 7 shows a threaded micro-ceramic part made in accordance with the invention.

Referring to FIG. 6, the sintered ceramic structure 28 with helical path 30 and passage 32 is mounted in support structure 50. Ceramic powder 40 is pressed into the passage 32 and helical groove 30, by press 52. Ceramic power 40 is selected from ceramics such as $Al_2O_3$, $ZrO_2$, AlN, BN, MgO, $Al_2O_3$—$ZrO_2$ and other oxide and non-oxide composites thereof. After pressing, the sintered ceramic structure 28 containing the pressed powder is sintered. During the sintering process, the pressed portion hardens, and acquires a raised helical thread along its length corresponding to the helical groove in the sintered ceramic structure 28 into which it was pressed. It is instructive to note that the this threaded potion is easily removed from the sintered ceramic structure 28 because it shrinks 20 to 30% relative to this sintered ceramic structure 28 to thereby facilitate removal of the threaded micro-ceramic part. FIG. 7 illustrates the finished sintered threaded micro-ceramic part 42 with raised helical thread 44 along its length.

The invention has been described with reference to a preferred embodiment. However, it will be appreciated that variations and modifications can be effected by a person of ordinary skill in the art without departing from the scope of the invention.

PARTS LIST:

10 ceramic component
12 sacrificial fiber
14 sintered ceramic plug
20 ceramic housing
22 cylindrical passage
24 grooved paths
28 unitary structure
30 helical path
32 cylindrical passage
40 ceramic powder
42 threaded micro-ceramic part
44 thread
50 support
52 press

We claim:

1. A method of fabricating a threaded micro-ceramic part, comprising the steps of:
   a) forming a sacrificial fiber having a melting temperature;
   b) winding the sacrificial fiber about a sintered ceramic plug generally in a shape of the threaded micro-ceramic part with the wound fiber corresponding to threads;
   c) providing a green ceramic housing formed with a passage and placing the plug with the wound sacrificial fiber within the passage;
   d) sintering at a temperature the green ceramic housing containing plug with the wound sacrificial fiber whereby the ceramic housing shrinks thereby converting the passage to a threaded cavity, wherein said sintering temperature is lower than the melting temperature of the sacrificial fiber;
   e) removing the wound sacrificial fiber from the sintered housing;
   f) removing the plug leaving behind a threaded mold which is adapted to form the threaded micro-ceramic part;
   g) compressing ceramic powder within the threaded mold; and
   h) sintering the compressed ceramic powder within said threaded mold to harden the ceramic powder to form the threaded micro-ceramic part whereby during sintering the formed threaded micro-ceramic part shrinks to permit its removal from the threaded mold.

2. The method for fabricating the threaded micro-ceramic part according to claim 1 wherein the sacrificial fiber is removed by etching.

3. The method for fabricating the threaded micro-ceramic part according to claim 1 wherein the sacrificial fiber is removed by increasing the temperature of the unitary structure above the melting point of the sacrificial fiber.

4. The method for fabricating the threaded micro-ceramic part according to claim 1, wherein the sacrificial fiber is tungsten, molybdenum, or tantalum.

5. The method according to claim 1 wherein the ceramic powder is a ceramic material selected from the group consisting of $Al_2O_3$, $ZrO_2$, AlN, BN, MgO, $Al_2O_3$—$ZrO_2$ and other oxide and non-oxide composites thereof.

6. The method according to claim 1 wherein the ceramic housing is formed from a ceramic material selected from the group consisting of $Al_2O_3$, $ZrO_2$, AlN, BN, MgO, $Al_2O_3$—$ZrO_2$ and other oxide and non-oxide composites thereof.

7. The method according to claim 1 wherein the ceramic plug is formed from a ceramic material selected from the group consisting of $Al_2O_3$, $ZrO_2$, AlN, BN, MgO, $Al_2O_3$—$ZrO_2$ and other oxide and non-oxide composites thereof.

* * * * *